F. BLANDO AND S. DUCA.
DISK CUTTING MACHINE.
APPLICATION FILED AUG. 6, 1921.
1,401,307.
Patented Dec. 27, 1921.
7 SHEETS—SHEET 3.
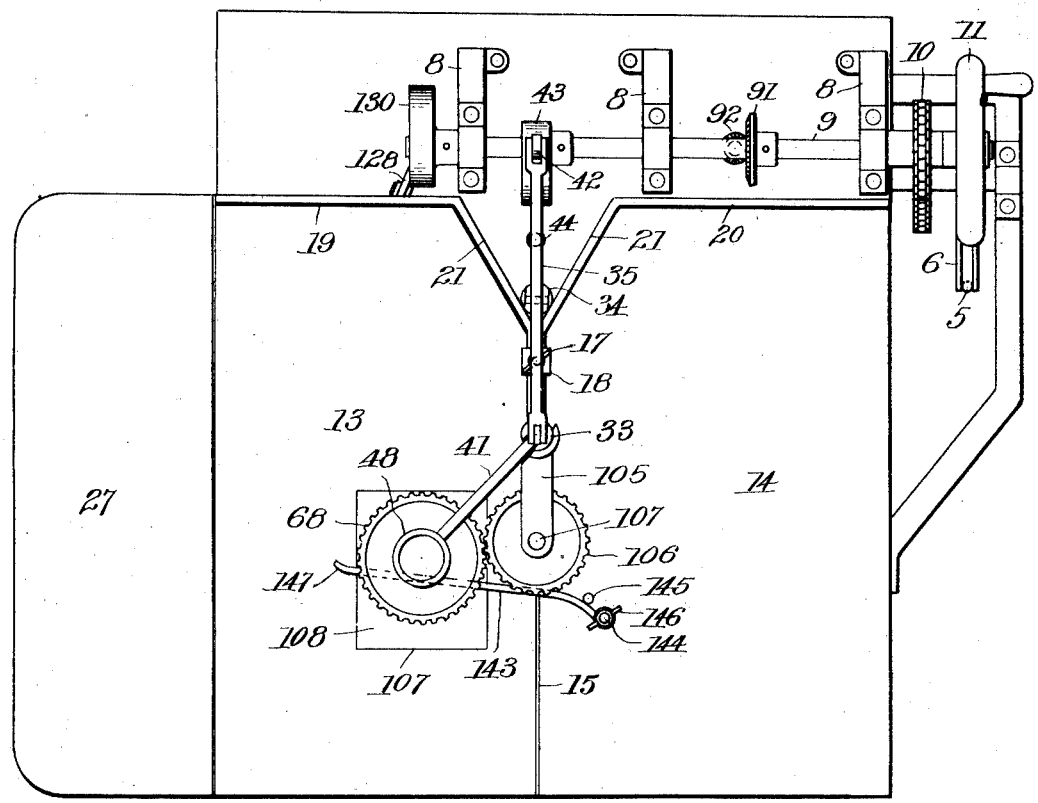
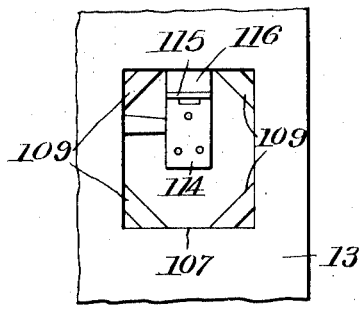
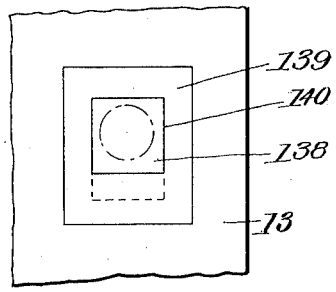
Inventors,
Frank Blando
and Sante Duca.
By Frederick V. Winters,
Attorney.

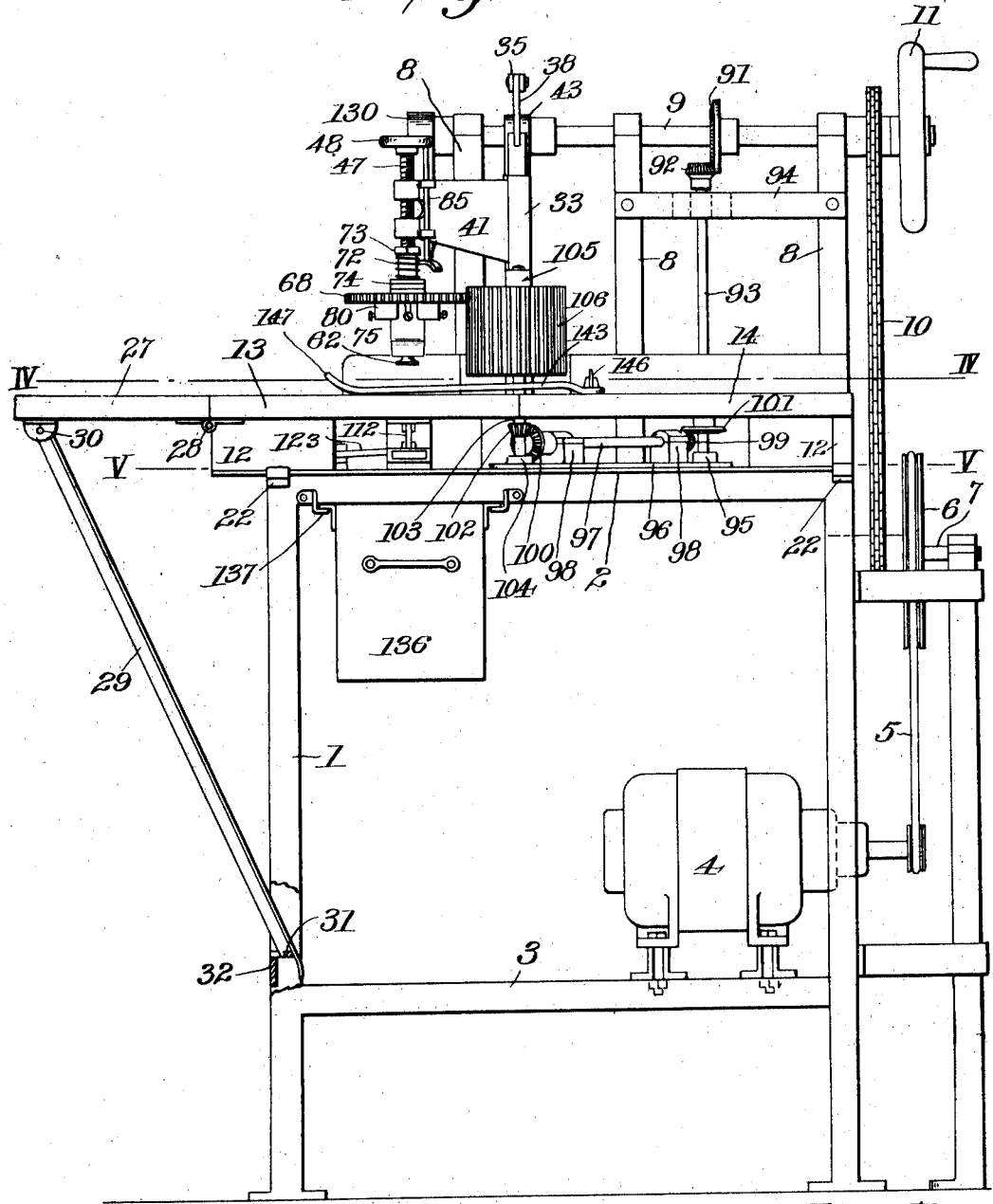
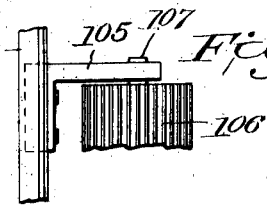

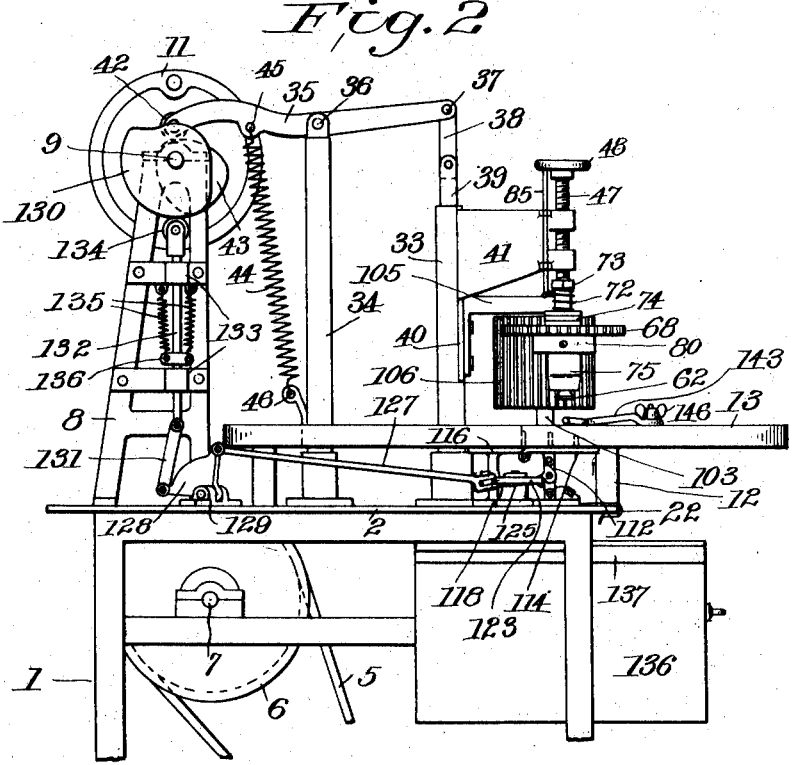
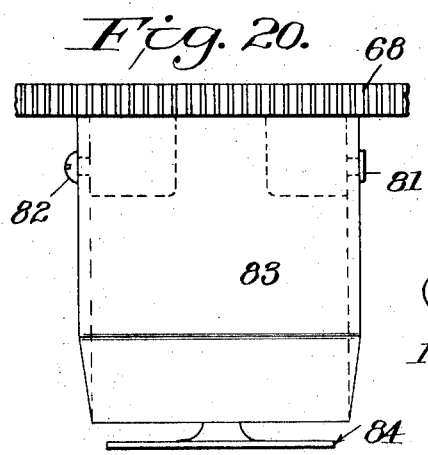
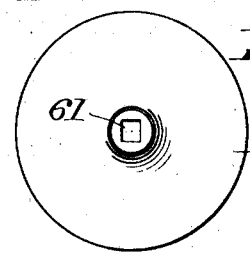

F. BLANDO AND S. DUCA.
DISK CUTTING MACHINE.
APPLICATION FILED AUG. 6, 1921.
1,401,307.
Patented Dec. 27, 1921.
7 SHEETS—SHEET 4.
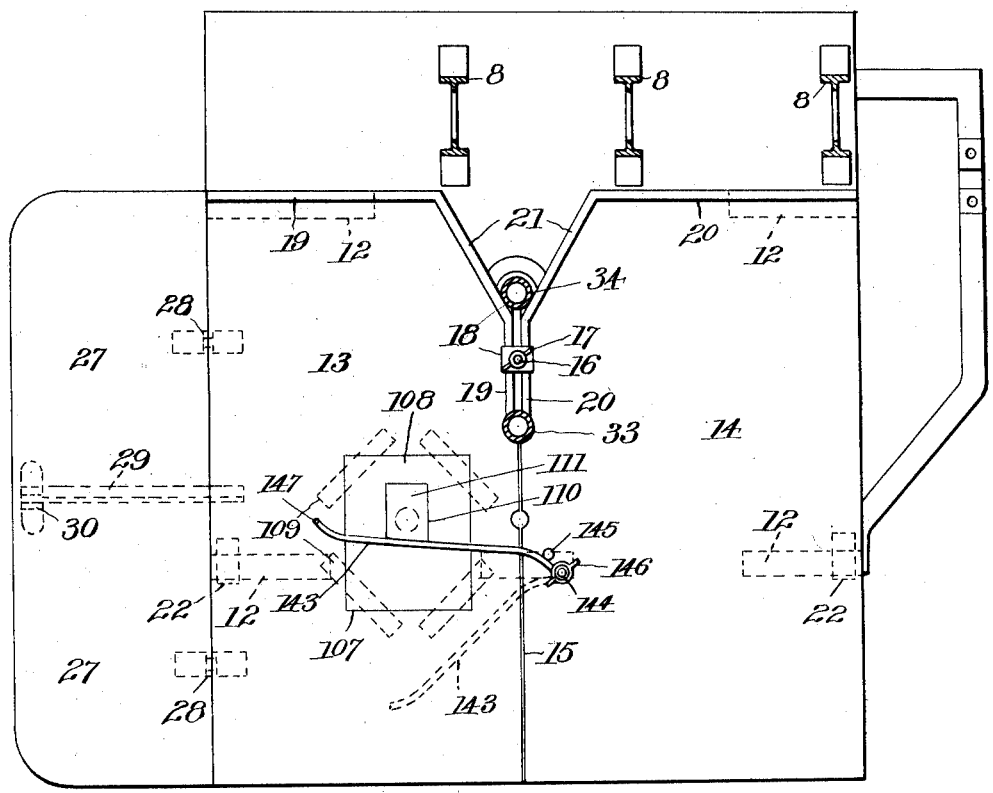
Fig. 4.
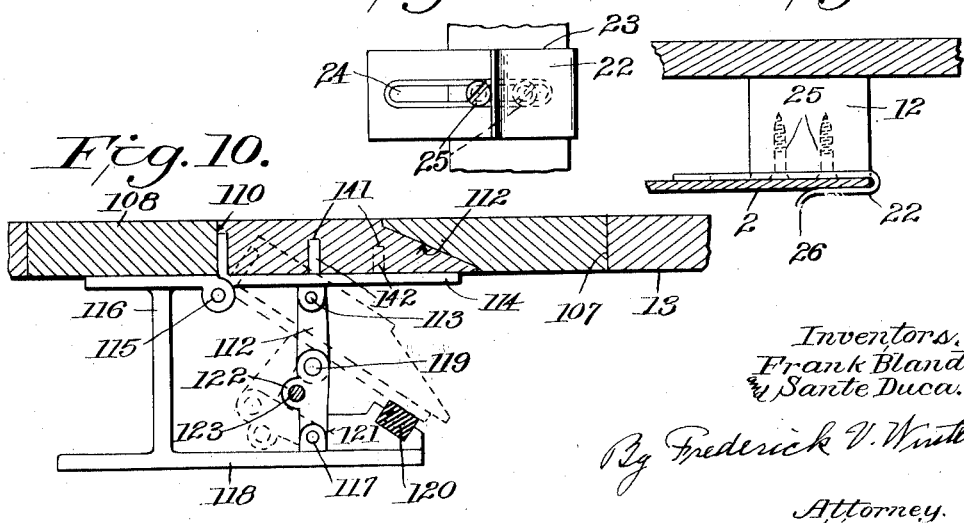
Fig. 9.   Fig. 8.
Fig. 10.
Inventors,
Frank Blando
& Sante Duca.
By Frederick V. Winters
Attorney.

F. BLANDO AND S. DUCA.
DISK CUTTING MACHINE.
APPLICATION FILED AUG. 6, 1921.

1,401,307.

Patented Dec. 27, 1921.

Inventors.
Frank Blando
and Sante Duca.

By Frederick V. Winters
Attorney

F. BLANDO AND S. DUCA.
DISK CUTTING MACHINE.
APPLICATION FILED AUG. 6, 1921.

1,401,307.       Patented Dec. 27, 1921.
7 SHEETS—SHEET 7.

Inventors.
Frank Blando
and Sante Duca.

By Frederick V. Winters,
Attorney.

UNITED STATES PATENT OFFICE.

FRANK BLANDO AND SANTE DUCA, OF NEW YORK, N. Y.

DISK-CUTTING MACHINE.

1,401,307.

Specification of Letters Patent.   Patented Dec. 27, 1921.

Application filed August 6, 1921. Serial No. 490,288.

*To all whom it may concern:*

Be it known that we, FRANK BLANDO and SANTE DUCA, citizens of the United States, residing at New York, in the county and State of New York, have invented certain new and useful Improvements in Disk-Cutting Machines, of which the following is a full, clear, and exact specification.

This invention relates to apparatus for cutting disks or wafers of altar-bread, but may be used for cutting thin disks of other material, and has for its object to provide improved means for cutting said disks and for discharging them from the cutter after they have been formed.

The invention contemplates the provision of a cylindrical cutter which may be rotated continuously by an electric motor, or other source of power, and which may be periodically lowered and raised for accomplishing the cutting operation without interrupting the rotary movement of the same. The cutter is provided with means for pressing the sheet of bread into contact with a supporting table during the cutting operation, said pressing means being yieldingly carried in advance of the cutter so as to engage said sheet prior to the contact of the cutter therewith.

The table, for supporting the sheet of bread, is provided with a movable section below the cutter, and means for lowering said movable section to discharge the cut disk, after downward movement of the cutter, is operated by the same power that rotates and reciprocates said cutter. This movable section of the table is renewable so that when one becomes worn by continued contact of the cutter therewith, it may be replaced by a new piece. Said movable section may also be interchanged with another one of different size to accommodate different sized cutters, it being the practice to form the disks or wafers of altar-bread in one size for the use of the priests and in a smaller size to be distributed to the congregation.

The invention will be further hereinafter described in connection with the accompanying drawings, which constitute part of this specification, and then more specifically defined in the claims at the end of the description.

In the accompanying drawings, wherein similar reference characters are used to designate corresponding parts throughout the several views:

Figure 1 is a front elevation of a machine constructed substantially in accordance with this invention, the parts being shown in the positions which they occupy when the cutter is at the end of its upward movement and is ready to descend, and the movable section or trap door in the table is raised flush with the plane of the top of said table for supporting a sheet of bread during the cutting operation upon the descent of said cutter.

Fig. 2 is a left hand side elevation of the machine as illustrated in Fig. 1, the lower portion of the supporting frame being broken away.

Fig. 3 is a plan view of the machine.

Fig. 4 is a horizontal section taken just above the table on the line IV—IV of Fig. 1.

Fig. 8 is a detailed sectional view of a portion of the table and top plate of the supporting frame showing the latch for connecting them.

Fig. 9 is a broken under plan view of said latch and the depending block on the table to which it is attached.

Fig. 10 is a detailed sectional view of the trap-door in the table taken longitudinally thereof, its lowered position being illustrated in dotted lines.

Fig. 11 is a detailed vertical section of the reciprocating carrier for the cutter and presser-foot.

Fig. 12 is a fragmentary sectional view of the adjusting means for the presser-foot.

Fig. 18 is a fragmentary plan view of the portion of the table in which the trap-door is arranged, showing said trap door and its surrounding frame removed.

Fig. 19 is a similar view showing the larger trap-door block and its frame in place.

Fig. 20 is a detailed elevation of the cutter and presser-foot carrier, similar to Fig. 11, showing the larger cutter and presser-foot in place.

Fig. 21 is a detailed plan view of the lever for actuating the trap-door, showing its connection with the toggle.

Fig. 22 is a detailed view showing the bracket for supporting the upper end of the elongated gear, and Fig. 23 is a detailed plan view of the larger presser-foot, showing the square socket therein to receive its carrier rod.

Figure 5:
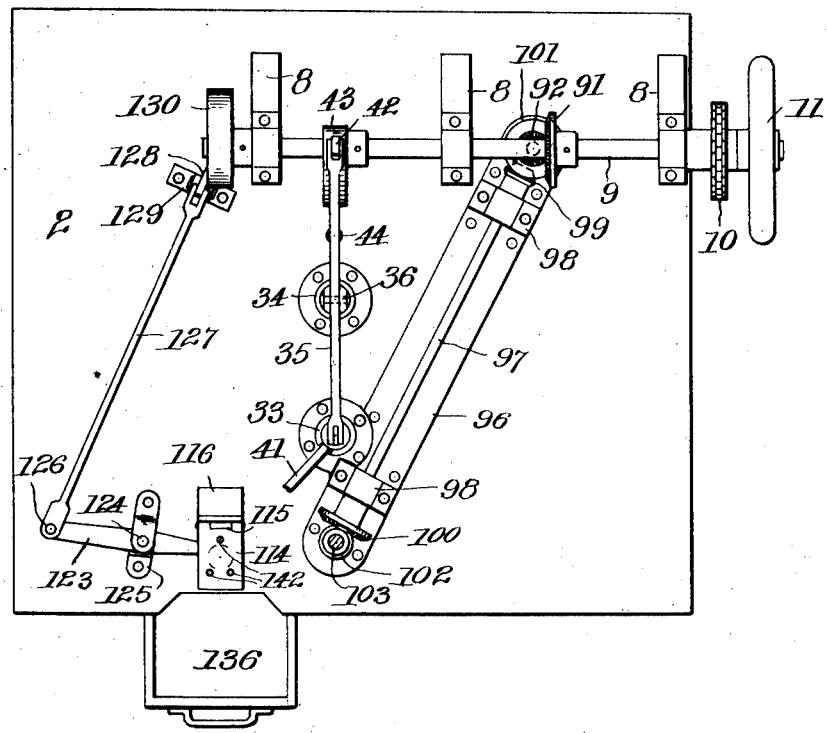
Fig. 5 is a horizontal section taken below the table on the line V—V of Fig. 1.

In the drawings, 1 indicates a supporting frame having a top plate 2 and cross piece 3 below said plate for supporting an electric motor 4, which is connected by a belt 5 with a sheave 6 on a shaft 7 suitably journaled on the frame 1 at one side thereof and below the plate 2. Standards 8 rise from the plate 2 for supporting the main shaft 9 above and at the rear of said plate, and said shaft 9 is operatively connected to the shaft 7 by a sprocket chain 10, whereby said main shaft and the operating mechanism of the machine may be driven by the motor 4. Said shaft 9 may also carry a hand wheel 11 for operating the same manually.

Mounted on the plate 2 of the frame 1 and spaced above the same by blocks 12 is a removable table comprising two sections 13 and 14 which meet along their inner edges, as at 15, and are secured in place by a bolt 16 extending upwardly from the plate 2 and fitted with a wing nut 17 and a flanged washer plate 18 engaging upstanding flanges 19 and 20, respectively, on the meeting edges of the table sections 13 and 14. The flanges 19 and 20 may be spaced slightly apart, as best shown in Fig. 4, to allow the bolt 16 to extend between them, and said flanges may be extended along the rear edges of the table sections which are preferably cut away, as at 21, Fig. 4. The table sections may also be secured to the plate 2 of the supporting frame 1 by means of sliding latches 22, best shown in Figs. 8 and 9, one of said latches being preferably adapted to engage each of the front corner portions of said plate. These latches are fitted to slide in notches 23 in the under faces of certain of the blocks 12, and have elongated slots 24 through which the heads of screws 25 extend, so that the sliding movement of the latch is limited by the engagement of said screw heads with the ends of said slots. Each latch has a portion folded upon itself for gripping the edge of the plate 2, and the extremity 26 of said folded portion is preferably bent or curved away from the plate, as clearly shown in Fig. 8, to provide a finger grip for actuating the latch and also for guiding said latch over the edge of the plate 2.

The table section 13 is preferably provided with a folding leaf 27 hinged thereto at 28 and having a folding brace 29 pivoted to the under side of the leaf at 30 and provided with a notch 31 at its lower end to engage a cross bar 32 of the frame 1, as best shown in Fig. 1. When the leaf 27 is to be folded, the brace 29 is disengaged from the cross bar 32, as will be readily understood.

Extending from the plate 2 upwardly between the meeting edges of the table sections 13 and 14 are two standards 33 and 34 spaced one behind the other, as best shown in Figs. 2 and 4. To the upper end of the rear standard 34 a lever 35 is intermediately pivoted at 36, while the forward end of said lever is pivoted at 37 to a link 38, in turn pivoted to a vertical slide 39 fitted in the standard 33 which is tubular in form and has a vertical slot 40 through which extends an arm 41 fixed to the vertical slide 39, said arm carrying the cutter and presser-foot, which will be hereinafter described. The rear end of the lever 35 carries a roller 42 which is held down in engagement with a cam 43 by a spring 44 connected to the lever at 45 and to the standard 34 at 46. The cam 43 is mounted on the main shaft 9, as clearly shown in Figs. 1, 2, 3 and 5, and is of such shape as to periodically rock the lever 35 for moving the slide 39 and its arm 41 vertically in the standard 33.

Vertically adjustable in the outer end of the arm 41 is a hollow screw 47 having a hand wheel 48 fixed to its upper end in any suitable manner, as by having an internally screw-threaded socket 49 engaging the upper end of the screw 47, and a set screw 50 carried by said hand wheel and extending into a longitudinal slot 51 in said screw. Two of the slots 51 are preferably provided at diametrically opposite points on the screws 47, and said slots extend down for a considerable distance from the upper end of the screw. Into said slots extend lugs 52 projecting radially from a cylindrical nut 53 mounted to slide axially in the hollow screw 47. A spring 54 is arranged in the upper end portion of said screw between the hand wheel 48 and the cylindrical nut 53 for yieldingly pressing said nut downwardly with its projecting lugs 52 engaging the lower end of the slots 51. A rod 55 extends upwardly through the hollow screw 47 and has its upper end portion 56 threaded to adjustably fit in the cylindrical nut 53, see Figs. 11 and 12. The upper extremity of said rod projects through the cylindrical nut and carries a ring 57, or other suitable obstruction therein, to prevent the rod from being turned downwardly out of the nut.

The lower end portion of the rod 55 projects from the screw 47 and is guided in a plug 58 fitted in the lower end of said screw and retained in place by a set screw 59. The lower end of rod 55 is squared at 60 to fit in a similarly shaped socket 61 in a presser-foot 62 which is detachably secured to said rod by means of a transverse screw 63, Fig. 11. Said presser-foot is preferably covered with cloth 64, the edges of the cloth being gathered around the shank of the presser-foot and secured thereto by one or more wrappings of cord 65. The gathered edges of the cloth and the cord securing the same, are covered by a flared collar 66 fitting around the shank of the presser-foot and secured in place by the screw 63 which detachably fastens said presser-foot to the rod 55.

The plug 58 extends annularly beyond the lower end of the screw 47 forming a supporting ledge 67 for a horizontal gear 68 which is mounted to rotate about the cylindrical lower end portion 69 of said screw 47. Ball bearings 70 are interposed between the ledge 67 and the hub 71 of the gear 68, and said gear is yieldingly held down upon said ball bearings 70 by a spring 72 coiled about the cylindrical portion 69 of the screw 47, and extending between a collar 73 mounted around said screw, and ball bearings 74 placed above said gear 68.

A cylindrical cutter 75 may be detachably connected to the hub 71 of the gear 68 by means of a lug 76 and a screw 77 projecting from said hub at diametrically opposite points to engage axially extending notches 78 and 79, respectively, in the upper end of said cutter. When the screw 77 is loosened, the cutter 75 may be readily slipped off of the hub 71, and when said cutter has its notches engaged with said lug and screw, as illustrated in Fig. 11, the tightening of said screw will retain the cutter in place. The gear 68 is provided with a segmental annular flange 80 depending therefrom eccentrically of the hub 71, and carrying a lug 81 and screw 82 at diametrically opposite points for detachably securing a larger cylindrical cutter 83 to said gear, as shown in Fig. 20. As illustrated in Fig. 11, when the smaller cylindrical cutter 75 is used, the presser-foot 62, associated therewith, is of slightly less diameter than the cutting edge of said cutter. When the larger cylindrical cutter 83 is employed for cutting disks of larger size for use by the priests, a larger presser-foot 84, Figs. 20 and 23, is employed, the same being constructed and detachably fastened to the rod 55 in the same manner as already described in connection with the presser-foot 62.

Figure 14:
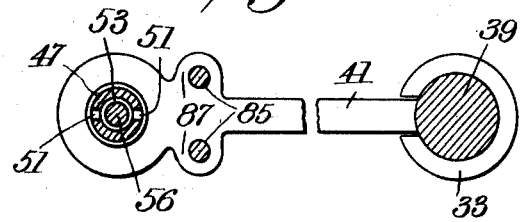
Fig. 14 is a section on the line XIV—XIV of Fig. 11, the main shaft and its supports being shown in plan.
Figure 15:
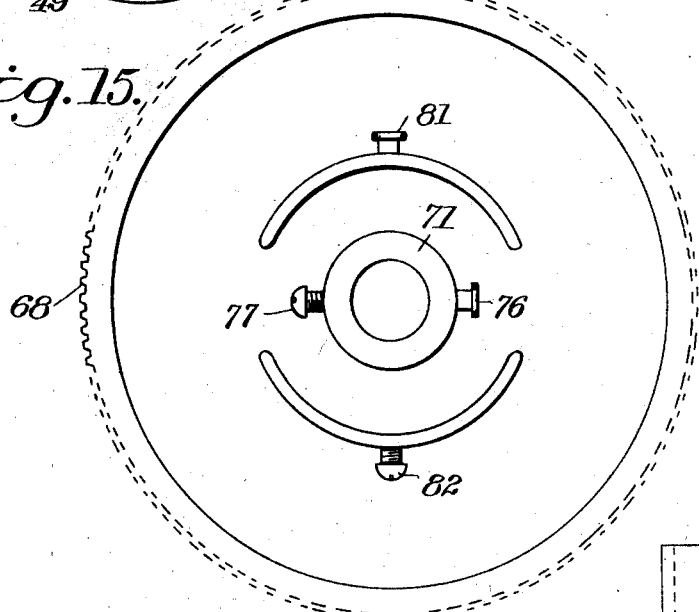
Fig. 15 is an under plan view of the cutter-carrying gear.
Figure 16:
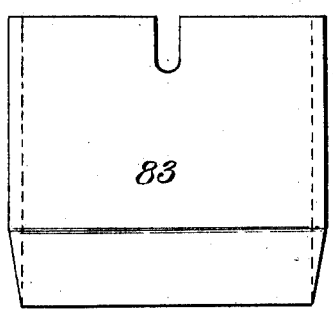
Figs. 16 and 17 are detailed elevations of the larger and smaller cylindrical cutters.
Figure 17:
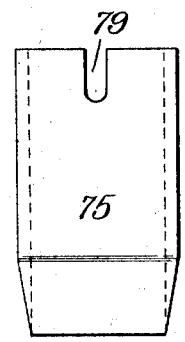

It will be noted that the screw 47 may be bodily adjusted vertically on the arm 41 for bringing the presser-foot and cutter nearer to or farther from the table. To retain said screw in adjusted position, one or more vertically sliding bolts 85 are mounted on said arm to engage an annular series of sockets 86 in the under face of the hand wheel 48. Two bolts 85 are indicated in Fig. 14, and they are guided in pairs of lugs 87 at opposite sides of the arm 41, but only one of said bolts need be long enough to engage the sockets 86 in the hand wheel 48. The lower ends of the bolts 85 are connected by a cross piece 88 having projecting end portions 89 serving as finger pieces for withdrawing the bolts 85 from the hand wheel 48 when the latter is to be rotated in order to vertically adjust the screw 47. A spring 90, connected to the arm 41 and to said cross piece 88, serves to yieldingly hold the bolts 85 in engagement with the hand wheel.

A beveled gear 91 is mounted on the main shaft 9 and meshes with a similar pinion 92 on the upper end of a vertical shaft 93, suitably journaled at its upper end in a cross piece 94 extending between adjacent standards 8, as best shown in Fig. 1. The lower end of said vertical shaft 93 is journaled at 95 in a strip 96 extending diagonally across the plate 2 on the supporting frame 1 and suitably fastened thereto. A horizontal shaft 97 is journaled in upstanding lugs 98 on the strip 96 and carries beveled pinions 99 and 100 on its opposite ends. The pinion 99 meshes with a beveled gear 101 on the lower end of the vertical shaft 93, while the pinion 100 meshes with a beveled pinion 102 on the lower end portion of another vertical shaft 103 which is also journaled at its lower end in the strip 96, as at 104. The vertical shaft 103 has its upper end journaled in a bracket 105, which may be detachably fastened to the standard 33, as indicated in Fig. 22, and said shaft carries an elongated gear 106 fast thereon and meshing with the gear 68, which carries the cutter.

It will be noted from the foregoing description that as long as the main shaft 9 is turned, said elongated gear 106 will be continuously rotated through the vertical shaft 93, horizontal shaft 97, and vertical shaft 103, and their intermeshing beveled gears or pinions, and that the cutter-carrying gear 68 will also be continuously rotated because it is in constant mesh with said elongated gear. It will further be noted that during each rotation of the main shaft 9 the arm 41 and screw 47 carrying the gear 68 will be reciprocated by the cam 43 acting upon the lever 35, as already described. The cutter is thus given a combined rotary and reciprocating movement, the former of which is continuous, while the latter is periodical.

In the table section 13 an opening 107 is formed below the cutter, and in said opening a frame 108 is removably supported upon diagonally arranged metal strips 109 secured to the under surface of said table section and extending across the corners of the opening 107, as shown in Figs. 4 and 18. Said frame 108 is designed to fit closely in the opening 107, so that it will be retained therein during the operation of the machine by frictional contact with the margins of said opening. In said frame 108 there is an opening 110 in which a trap door or block 111 is fitted, the same being preferably provided with a beveled forward end 112 fitting a correspondingly shaped front edge portion of the opening 110 in the frame.

In the operation of the machine, the cylindrical cutter operates on the block 111, and in order to effectively discharge the cut disks, said block or trap door is adapted to be periodically lowered, as indicated in dotted lines in Fig. 10. This periodical movement of the trap door is affected by a toggle 112, the upper link of which is pivotally connected at 113 to a plate 114 hinged at 115 to a bracket 116 suitably secured to the plate 2, said trap door being mounted on the plate 114, as will be hereinafter explained more in detail. The lower link of the toggle is pivotally connected at 117 to a lower portion 118 of the bracket 116, and said upper and lower links are pivotally connected to each other at 119. When the toggle is extended, as shown in solid lines in Fig. 10, the trap door or block 111 is supported on a level with the frame 108 and the table section 13, but when said toggle is broken or collapsed, as indicated in dotted lines in the same figure, the trap door will be lowered and its free end will come in contact with a buffer 120, of rubber or other suitable material, mounted on the lower portion 118 of the bracket 116. A vertical shoulder or abutment 121 is formed on said lower portion of the bracket to limit the movement of the toggle to a vertical position when it is being extended. The lower link of the toggle is provided with an offset 122 in the direction of its folding movement, and into said offset, which is perforated for that purpose, one end of a lever 123 loosely extends, as best shown in Fig. 21.

Said lever 123 is intermediately pivoted at 124 to an inclined bracket 125 suitably secured to the plate 2 below the table, and the other end of the lever is pivotally connected at 126 to a connecting rod 127 attached at its rear end to one extremity of a segmental rocker member 128 journaled in a bracket 129 on the plate 2 at a point near the rear edge of the table and almost directly below a cam 130 on the main shaft 9. The other extremity of the rocker member 128 is connected by a link 131 to a vertical push rod 132 which is guided in straps 133 on one of the standards 8 and has a roller 134 at its upper end to engage said cam 130. The push rod 132 is yieldingly raised to hold said roller 134 constantly in engagement with the cam 130 by springs 135, connected at their upper ends to the upper strap 133, and at their lower ends to a collar 136 suitably clamped around said push rod.

The relative shapes of the cams 130 and 43 are such as to cause the dropping of the trap door 111 through the action of the push rod 132, link 131, rocker member 128, connecting rod 127, lever 123 and toggle 112, as soon as a disk has been severed by the cutter and before said cutter is raised out of contact with said trap door. It will be noted that the presser-foot normally projects slightly below the cutter, so that when the cutter-carrying screw 47 is lowered through the action of the cam 43 and associated mechanism, said presser-foot will come in contact with a sheet of altar bread (not shown) before the cutter, and that said sheet of bread will consequently be held in contact with the upper surface of the trap-door 111 by the compressed spring 54 while the cutter is moved into contact with the bread and cuts through the same to form a disk. When the disk has been completely severed, the trap-door is dropped, as already explained, and the compressed spring 54 then expands and again projects the presser-foot below the cutter, thereby positively separating the cut disk from the sheet of bread, and insuring the discharge of said disk as the trap-door drops. As the cutting edge of the cutter wears off, the presser-foot may be adjusted to normaled stand at the proper distance below the same by turning the rod 55 in the cylindrical nut 53. The disks discharged at the periodical dropping of the trap-door 111 fall into a container or drawer 136 removably supported on ledges 137 secured to the frame 1.

Figure 6:
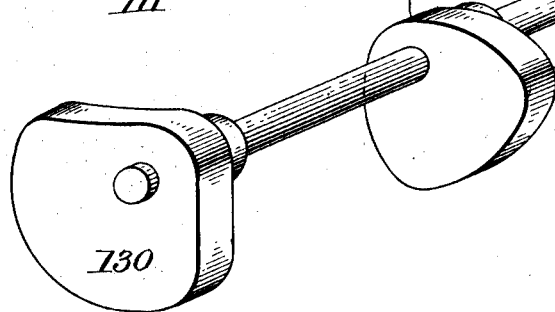
Fig. 6 is a detailed perspective view of one of the interchangeable trap-door blocks showing the sockets in the under face thereof to receive the pins on its hinged support.
Figure 7:
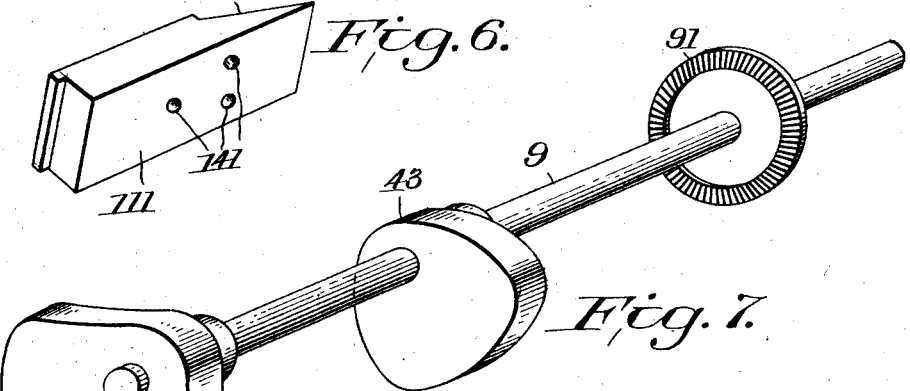
Fig. 7 is a detailed perspective view of a portion of the shaft carrying the cams and gear for operating said trap door and rotating and reciprocating the cutter.
Figure 13:
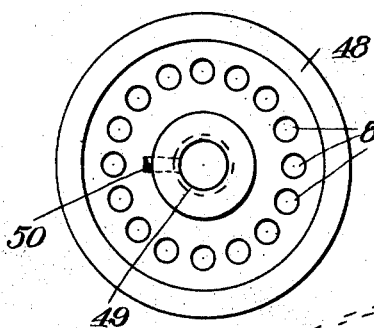
Fig. 13 is an under plan view of the hand wheel at the top of the cutter and presser-foot carrier.

When the larger cutter 83 and larger presser-foot 84 are used, a correspondingly larger block 138, Fig. 19, is substituted for the block 111, a frame 139, having an opening 140 to fit said block 138, being used in place of the frame 108. The blocks 111 and 138 have sockets 141 in their under faces, as illustrated in Figs. 6 and 10, to fit over upwardly extending pins 142 on the hinged plate 114, so that blocks of different sizes may be readily interchanged and, when a block becomes worn from use, a new one may be substituted therefor.

To prevent the fingers of the operator from coming below the cutter, a guard 143 is pivoted at one end to the table section 14 at 144 and is adapted to extend across the frame 108, as shown in solid lines in Fig. 4. Said guard 143 may be made of rigid wire and is disposed slightly above the top of the table, as shown in Fig. 1. A stop 145 on the table limits the rearward movement of the guard, and a thumb nut 146 on the pivot pin 144 is provided for clamping said guard in operative position. When the frame 108 is to be removed, the guard may be swung out of the way, as indicated in dotted lines in Fig. 4, the thumb nut 146 being first loosened. A sheet of altar bread (not shown) may be inserted below the guard 143, the free end of which is preferably curved upwardly, as at 147, Fig. 1, to guide the sheet below the same. Said guard not only prevents the fingers of the operator from getting below the cutter, but also serves to hold the sheet of bread down upon the table during the cutting operation. At the same time, the guard does not interfere with the sliding of the sheet of bread over the table for feeding the same below the cutter.

We claim:

1. The combination with a cylindrical cutter, of means for reciprocating the same, a presser-foot mounted within the cutter, and a covering mounted around said presser-foot for the purpose specified.

2. The combination with a cylindrical cutter, of means for reciprocating the same, a presser-foot mounted within the cutter, a detachable covering for the presser-foot having its margins secured thereto, and a collar overlapping said margins of the covering.

3. The combination with a cylindrical cutter, of a carrier therefor, means for reciprocating said carrier, a presser-foot, a support therefor arranged within the cylindrical cutter, means for detachably connecting said presser-foot to said support, a covering for said presser-foot having its margins secured thereto, and a collar overlapping said margins of the covering and detachably secured to the presser-foot.

4. The combination with a cylindrical cutter, of a carrier therefor, means for reciprocating said carrier, a presser-foot, a support therefor arranged within the cylindrical cutter, a covering for the presser-foot having its margins detachably fastened thereto, a collar overlapping said margins of the cover, and common means for detachably fastening said collar and presser-foot to said support.

5. The combination with a carrier, of means for reciprocating said carrier, means for retaining said carrier against rotation, a cylindrical cutter mounted for rotation on said carrier, and a presser-foot supported by a non-rotating part of the carrier.

6. The combination with a carrier, of means for reciprocating said carrier, means for retaining said carrier against rotation, a cylindrical cutter mounted for rotation on said carrier, a presser-foot supported by a non-rotating part of the carrier, and means for yieldingly holding said presser-foot normally extended in advance of the cutter.

7. The combination with a carrier, of means for reciprocating the same, a gear mounted to rotate on said carrier, a cylindrical cutter attached to said gear for rotation therewith, an elongated gear constantly in mesh with the cutter-carrying gear during the reciprocations of the latter with the carrier, and means for driving said elongated gear.

8. The combination with a carrier, of means for reciprocating the same, a gear mounted to rotate on the carrier, means on said gear for detachably securing cylindrical cutters of different sizes thereto, and means for rotating said gear.

9. The combination with a support, of means for reciprocating said support, a carrier adjustable on the support, means for retaining said carrier in adjusted position, a cylindrical cutter mounted to rotate on the carrier, and means for rotating said cutter.

10. The combination with a support, of means for reciprocating said support, a carrier adjustable on the support, means for retaining said carrier in adjusted position, a gear mounted to rotate on the carrier, a cylindrical cutter attached to said gear to rotate therewith, and means for rotating the gear.

11. The combination with a support, of means for reciprocating said support, a carrier adjustable on the support, means for retaining said carrier in adjusted position, a cylindrical cutter mounted to rotate on the carrier, means for rotating said cutter, and a presser-foot supported by a non-rotating part of the carrier within said cylindrical cutter.

12. The combination with a carrier, of means for reciprocating the same, a cylindrical cutter mounted to rotate on the carrier, means for rotating said cutter, a presser-foot supported by the carrier within the cutter, means for yieldingly holding said presser-foot projected in advance of the cutter, and means for adjusting the presser-foot with respect to the cutter for the purpose specified.

13. The combination with a tubular carrier, of means for reciprocating the same, a cylindrical cutter mounted on said carrier, a rod arranged within the tubular carrier and projecting from the lower end thereof inside the cylindrical cutter, a presser-foot mounted on the lower end of said rod, resilient means arranged in the cylindrical carrier for yieldingly holding said presser-foot projected in advance of the cutter, and means to limit the outward movement of said presser foot.

14. The combination with a tubular carrier, of means for reciprocating the same, a cylindrical cutter mounted on the carrier, a member mounted to slide in the tubular carrier, means for retaining said member against rotation in the carrier, a rod arranged in said tubular carrier and extending from its lower end inside the cylindrical cutter, a presser-foot attached to the lower end of said rod, means for adjustably connecting said rod to said sliding member, and resilient means engaging said sliding member for yieldingly holding said presser foot projected in advance of the cutter.

15. The combination with a tubular carrier, of means for reciprocating the same, a cylindrical cutter mounted on the carrier, a member mounted to slide in the tubular carrier, means for retaining said member against rotation in the carrier, a rod arranged in said tubular carrier and extending from its lower end inside the cylindrical cutter, a presser-foot attached to the lower end of said rod, means for adjustably connecting said rod to said sliding member, and resilient means arranged in the tubular carrier and engaging said sliding member for yieldingly holding the presser-foot projected in advance of the cutter.

16. The combination with a tubular carrier, of means for reciprocating the same, a tubular cutter mounted on said carrier, a sliding member arranged in the tubular carrier, means for retaining said sliding member against rotation in the carrier, a rod adjustably connected to said sliding member and extending from the lower end of the carrier inside the cylindrical cutter, a presser-foot attached to the lower end of said rod, resilient means engaging the sliding member for yieldingly holding the presser-foot projected in advance of the cutter, and means for limiting the outward movement of said rod with respect to the sliding member for the purpose specified.

17. The combination with a tubular carrier, of means for reciprocating the same, a cylindrical cutter mounted on said carrier, a nut mounted to slide in the tubular carrier, a rod arranged in said carrier and having its upper end threaded to adjustably engage said nut, the lower end of said rod extending below the carrier inside the cylindrical cutter, a presser-foot attached to the lower end of said rod, means for limiting the downward movement of the nut and retaining it against rotation in the carrier, resilient means engaging said nut for yieldingly holding the presser-foot projected in advance of the cutter, and means for preventing said rod from being turned out of engagement with said nut.

18. The combination with a carrier adapted to be reciprocated, of a cylindrical cutter mounted to rotate on said carrier, and means, for cushioning said cutter on the carrier so that it may yield when brought into contact with the work.

19. The combination with a support adapted to be reciprocated, of a cylindrical cutter mounted to rotate and slide on said carrier, and resilient means for normally holding the cutter at one end of its range of sliding movement on the carrier for the purpose specified.

20. The combination with a support adapted to be reciprocated, of a carrier having threaded engagement with said support, a cutter mounted on said carrier and adapted to be vertically adjusted with the latter when the same is turned in the support, and means for locking said carrier against rotation in the support.

21. The combination with a support adapted to be reciprocated, of a carrier having threaded engagement with said support, a cutter mounted on said carrier and adapted to be vertically adjusted with the latter when the same is turned in the support, a hand wheel on the carrier and having an annular series of sockets therein, and a bolt mounted on the support to engage said sockets for retaining the carrier against rotation in the support.

22. The combination with a support adapted to be reciprocated, of a carrier having threaded engagement with said support, a cutter mounted on said carrier and adapted to be vertically adjusted with the latter when the same is turned in the support, a hand wheel on the carrier and having an annular series of sockets therein, a bolt mounted on the support to engage said sockets for retaining the carrier against rotation in the support, and resilient means for normally holding said bolt in engagement with one of said sockets.

23. The combination with a cutter adapted to be reciprocated, of a work support arranged below said cutter, a presser-foot yieldingly mounted in advance of the cutter and adapted to be reciprocated therewith, and means for moving said support after each cutting operation and while the cutter and presser foot are both engaged with the work for the purpose specified.

24. The combination with a cylindrical cutter, of means to reciprocate the same, means for rotating said cutter, a work-supporting table having an opening arranged below the cutter, a trap-door to fit said opening, means for supporting said trap-door in the opening during each cutting operation, and means for dropping the trap-door below the table after each cutting operation.

25. The combination with a cutter adapted to be reciprocated, of a work-supporting table having an opening arranged below the cutter, a trap-door to fit said opening, means for supporting said trap-door in the opening during each cutting operation, and means for dropping said trap-door below the table after each cutting operation for discharging the work.

26. The combination with a cutter adapted to be reciprocated, of a presser-foot yieldingly carried in advance of the cutter, a work-supporting table having a trap-door arranged below the cutter, and means for dropping said trap-door after each cutting operation and while the cutter and presser-foot are both in contact with the work, said presser-foot assisting in the discharge of the work when said trap-door is dropped by resuming its normal position in advance of the cutter.

27. The combination with a cutter adapted to be reciprocated, of a work-supporting table having a trap door arranged below the cutter, a renewable block mounted on said trap-door, and means for dropping the trap-door after each cutting operation for discharging the work.

28. The combination with a cutter adapted to be reciprocated, of a work-supporting table having a trap-door arranged below the cutter, said trap-door comprising a supporting plate having upstanding lugs, and a renewable block having corresponding sockets in its under surface to detachably engage said lugs, and means for dropping said trap-door after each cutting operation for discharging the work.

29. The combination with a cutter adapted to be reciprocated, of a work-supporting table having a trap-door arranged below the cutter and having its free end beveled, there being an opening in the table to fit around the trap-door and having an undercut portion corresponding to said beveled end of said trap-door, and means for dropping said trap-door after each cutting operation for discharging the work.

30. The combination with a cutter adapted to be reciprocated, of a work-supporting table having a trap-door arranged below the cutter, a toggle for supporting said trap-door in the plane of the table, and means for collapsing said toggle after each cutting operation for dropping the trap-door and discharging the work.

31. The combination with a cutter adapted to be reciprocated, of a work-supporting table having a trap-door arranged below the cutter, means for dropping said trap-door after each cutting operation for discharging the work, and a buffer for arresting the downward movement of said trap-door.

32. The combination with a cutter adapted to be reciprocated, of a work-supporting table having an opening therein below the cutter, a frame removably fitted in said opening and having a trap-door arranged directly under the cutter, said frame and trap-door being interchangeable with a frame having a trap-door of different size to accommodate cutters of different sizes, and means for dropping said trap-door after each cutting operation for discharging the work.

33. The combination with a cylindrical cutter, of means for continuously rotating said cutter, means for periodically reciprocating the cutter, a movable work support arranged below the cutter, means for periodically moving said support for discharging the work, and means for synchronizing the movement of said cutter and work support whereby the latter will be moved before the former is raised therefrom.

34. The combination with a driving shaft, of a cylindrical cutter, means operatively connected to said driving shaft for continuously rotating said cutter, a slide supporting the cutter, a lever connected to said slide, a cam on the driving shaft for rocking said lever and reciprocating the cutter, and resilient means for holding said lever in contact with said cam.

35. The combination with a driving shaft, of a cylindrical cutter, means operatively connected to said driving shaft for continuously rotating said cutter, means also connected to said driving shaft and operated thereby for periodically reciprocating the cutter, a movable work support arranged below the cutter, and means operated by the driving shaft for periodically moving said work support to discharge the work after each cutting operation.

36. The combination with a driving shaft, of a cylindrical cutter, means operatively connected to said driving shaft for continuously rotating said cutter, means also operated by the driving shaft for periodically reciprocating the cutter, a movable work support arranged below the cutter, a cam on said driving shaft, a push rod yieldingly held in contact with said cam, a rocker member connected to said push rod, and means connected to said rocker member for periodically moving the work support to discharge the work after each cutting operation.

37. The combination with a driving shaft, of a cylindrical cutter, means operatively connected to said driving shaft for continuously rotating said cutter, means also operated by the driving shaft for periodically reciprocating the cutter, a movable work support arranged below the cutter, a cam on said driving shaft, a push rod yieldingly held in contact with said cam, a rocker member connected to said push rod, a toggle for moving the work support, and operating means for said toggle connected to said rocker member, whereby the work support is periodically moved to discharge the work after each cutting operation.

38. The combination with a driving shaft, of a cylindrical cutter, means operatively connected to said driving shaft for continuously rotating said cutter, means also operated by the driving shaft for periodically reciprocating the cutter, a movable work support arranged below the cutter, a cam on said driving shaft, a push rod yieldingly held in contact with said cam, a rocker member connected to said push rod, a toggle for moving the work support, a lever operatively connected to said toggle, and a connecting rod extending from said lever to said rocker member, whereby the work support is periodically moved to discharge the work after each cutting operation.

39. The combination with a supporting frame, of a driving shaft mounted thereon, a cylindrical cutter mounted to be reciprocated on said support, a work supporting table spaced above said supporting frame, and means for rotating and reciprocating said cutter from said driving shaft, said means extending between the supporting frame and table and below the latter.

40. The combination with a supporting frame, of a driving shaft mounted thereon, a cylindrical cutter mounted to be reciprocated on said support, a work supporting table spaced above said supporting frame, a trap-door in said table below the cutter, and means for rotating and reciprocating the cutter and for moving said trap door, said means being actuated by the driving shaft and extending between the supporting frame and table and below the latter.

41. The combination with a supporting frame, of a work-supporting table spaced above the same, sliding latches on the table for detachably connecting the same to the frame, a cutter arranged above the table, and means for reciprocating said cutter extending below said table.

42. The combination with a supporting frame, of a work-supporting table mounted thereon and having a plurality of sections provided with adjacent upstanding flanges, a bolt extending from said frame between said flanges, a nut on said bolt, and a washer having depending flanges to engage the flanges on the table sections for securing them to the frame.

43. The combination with a cutter adapted to be reciprocated, of a work-supporting table arranged below the cutter, a trap-door in said table directly under the cutter, said trap-door being movable for discharging the work after each cutting operation, and a guard secured to the table and extending across the same in front of the trap door for the purpose specified.

44. The combination with a cutter adapted to be reciprocated, of a work-supporting table arranged below the cutter, there being a removable section in said table directly under the cutter, and a guard pivotally connected to the table to normally extend across said removable section in front of the cutter and adapted to be swung from above the removable section when the latter is to be displaced.

In testimony whereof we have signed our names to this specification.

FRANK BLANDO.
SANTE DUCA.